(12) United States Patent
Dogan et al.

(10) Patent No.: US 9,993,108 B2
(45) Date of Patent: Jun. 12, 2018

(54) CONTAINER HOLDER WITH FILTRATION UNIT FOR USE IN A NUTRITIONAL PREPARATION MACHINE

(71) Applicant: NESTEC S.A., Vevey (CH)

(72) Inventors: Nihan Dogan, La Croix-sur-Lutry (CH); Heinz Wyss, Oberdiessbach (CH); Daniel Roland Manser, Spiez (CH); Nicolas Jean-Guy Bezet, Macon (FR)

(73) Assignee: Nestec S. A., Vevey (CH)

( * ) Notice: Subject to any disclaimer, the term of this patent is extended or adjusted under 35 U.S.C. 154(b) by 659 days.

(21) Appl. No.: 14/382,069

(22) PCT Filed: Feb. 22, 2013

(86) PCT No.: PCT/EP2013/053539
§ 371 (c)(1),
(2) Date: Aug. 29, 2014

(87) PCT Pub. No.: WO2013/127696
PCT Pub. Date: Sep. 6, 2013

(65) Prior Publication Data
US 2015/0027318 A1 Jan. 29, 2015

(30) Foreign Application Priority Data
Feb. 29, 2012 (EP) .................................. 12157452

(51) Int. Cl.
*A47J 31/44* (2006.01)
*A47J 31/40* (2006.01)
*A47J 31/60* (2006.01)

(52) U.S. Cl.
CPC ......... *A47J 31/4403* (2013.01); *A47J 31/407* (2013.01); *A47J 31/605* (2013.01)

(58) Field of Classification Search
CPC .... A47J 31/407; A47J 31/4403; A47J 31/605; B65D 85/8043
(Continued)

(56) References Cited

U.S. PATENT DOCUMENTS

| | | |
|---|---|---|
| 6,202,541 B1 | 3/2001 | Cai |
| 2002/0059870 A1* | 5/2002 | Walters, Jr. ............. A23F 5/267 99/298 |

(Continued)

FOREIGN PATENT DOCUMENTS

| | | |
|---|---|---|
| CN | 101516409 | 7/2009 |
| CN | 101977537 A | 2/2011 |

(Continued)

OTHER PUBLICATIONS

PCT International Search Report, dated Mar. 13, 2013, in PCT/EP2013/053539, filed Feb. 22, 2013.

(Continued)

*Primary Examiner* — Thien S Tran
(74) *Attorney, Agent, or Firm* — Dunlap Codding, P.C.

(57) ABSTRACT

Container holder (3) for use in a nutritional liquid preparation machine (1) for the preparation of a nutritional liquid from the mixture of ingredients contained in a container and liquid supplied by the machine in the container; said holder comprising a body with a container receiving seat (31) arranged for receiving the container (4) in a defined container sitting position and a filtration unit (12); such filtration unit comprising a liquid outlet (25) wherein the filtration unit is arranged with the container holder to be movable between a first position in which the container receiving seat (31) of the holder is uncovered for enabling the loading and unloading of the container in the container holder and a second position in which the container receiving seat (31) is covered by the filtration unit for enabling the liquid outlet (Continued)

(25) of the filtration unit to be positioned at the inlet side of the container (4) when a container is present in the container holder (3).

14 Claims, 9 Drawing Sheets

(58) Field of Classification Search
USPC ...................... 99/295, 323; 426/77, 115, 433
See application file for complete search history.

(56) References Cited

U.S. PATENT DOCUMENTS

| | | | |
|---|---|---|---|
| 2004/0118290 A1* | 6/2004 | Cai ..................... | A47J 31/4478 99/275 |
| 2005/0236323 A1 | 10/2005 | Oliver et al. | |
| 2011/0041700 A1* | 2/2011 | Epars ..................... | A47J 31/06 99/295 |
| 2015/0056330 A1 | 2/2015 | Dogan et al. | |

FOREIGN PATENT DOCUMENTS

| | | |
|---|---|---|
| EP | 2082670 | 7/2009 |
| WO | 200150875 | 7/2001 |
| WO | 2004026089 | 4/2004 |
| WO | WO2008/012314 | 1/2008 |
| WO | WO2010/128051 | 11/2010 |
| WO | 2013127694 A1 | 9/2013 |

OTHER PUBLICATIONS

Written Opinion of the International Searching Authority, dated Mar. 13, 2013, in PCT/EP2013/053539, filed Feb. 22, 2013.
First Office Action for Chinese Patent Application No. 201380022525.9, dated Mar. 25, 2016.
First Office Action for Chinese Patent Application No. 201320022541.8, dated Apr. 22, 2016.
International Search Report, dated Mar. 1, 2013, in PCTEP2013/05351, filed Feb. 22, 2013.
Written Opinion of the International Searching Authority, dated Mar. 1, 2013, in PCTEP2013/05351, filed Feb. 22, 2013.

\* cited by examiner

CONTAINER HOLDER WITH FILTRATION UNIT FOR USE IN A NUTRITIONAL PREPARATION MACHINE

FIELD OF THE INVENTION

The present invention relates to the field of the hygienic preparation of ready-to-drink nutritional liquids such as infant milk or gums. In particular, the invention relates to a filtration system adaptable to a preparation machine which utilizes containers containing ingredients adapted for the preparation of such nutritional liquids by mixing nutritional ingredients such as infant formula with liquid.

BACKGROUND OF THE INVENTION

An intelligently designed machine may greatly facilitate the preparation of nutritional liquids such as infant milk and may considerably reduce the preparation time for the parents, while maintaining a fully safe delivery and a clean environment. A solution consists in providing a container containing ingredients adapted for the preparation of a nutritional delivery after the ingredients are mixed with liquid in the container. The container may be a single-portion capsule or baby bottle or any other suitable package containing a pre-metered portion of ingredients. Usually, the container is designed for being associated to a dedicated preparation machine in which liquid and the ingredients are mixed. The ingredients may be solid (e.g., a powder), liquid or jellified.

WO2010/128051 relates to a capsule and device for preparing a nutritional product; wherein the device comprises a fluid interface with a liquid injector and a gas injector for injecting, respectively, liquid then gas into the capsule; wherein the gas injector is spatially distant from the liquid injector or liquid inlet in the capsule. Gas, in particular compressed air, is injected in the capsule to empty the capsule from residual liquid and/or food. The capsule may thus be designed with a filter unit comprising a liquid inlet and a gas inlet both communicating with an outlet nozzle. The filter unit may be a separate part which is associated with the capsule at the time of use, e.g., during insertion of the capsule in the fluid supply device. For instance, the filter unit can be a part which is associated to the liquid injector or integrated in the liquid injector.

Co-pending European patent application No. 11164347.4 relates to an insert for use in a food preparation machine wherein the insert comprises a liquid separation structure for preventing liquid from entering in the gas injector of the machine and/or from spreading all over the fluid interface. In particular, the insert is arranged with a structure closing the liquid communication from the liquid passage to the gas injector area.

Co-pending European patent application No. 11185427.9 relates to a filter cap for filtering and dispensing a nutritional composition. The cap is connected to a container containing a predefined amount of nutritional formula base for the preparation of a ready-to-drink aqueous nutritional formula composition.

WO2010/128051 contemplates a liquid filtering solution in which the filter unit is made separable from the capsule. An advantage is essentially that lower-cost capsules can be used in the machine whereas the filter unit can be re-used several times. However, its integration to the machine is complicated because the access to the liquid injector is uneasy. Therefore, it is practically difficult to provide a solution that can be installed conveniently and periodically.

A second problem is that the filter unit is a complex element involving many pieces thereby requiring complex assembling lines. Therefore, it makes it an expensive spare part.

US2005/0236323A1 relates to a water filter for hot beverage brew basket including a filter holder for receiving a filter; the filter holder comprising support tabs to fit in depressed areas of the brew basket. In certain modes, the filter holder sits in a carrier which can position itself in the brew basket or be hinged to the brew basket. Such device is essentially designed for positioning a water filter unit into a brew basket without requirements for pressure-tight engagement of the filter unit with an hypothetical container placed in the brew basket. The brew basket is essentially designed for the percolation of coffee under water dripping under gravity through the filter and brew basket without stringent requirement for preventing bypass of the water, possible flowing of water over the filter unit and contamination of the ingredients contained in the basket with untreated water. Therefore, such device is not adapted for the hygienic delivery of sensitive nutritional products such as infant formula and the like.

The present invention aims at proposing a solution alleviating the disadvantages of the prior art. In particular, the invention provides a solution for reducing the amount of disposable material of the system while maintaining a satisfying level of hygiene. The invention also provides a solution for reducing the complexity and the cost of portioned containers while maintaining a satisfying level of hygiene during the preparation of the nutritional composition. In particular, it is important to ensure that no unfiltered liquid can enter in the container to possibly contaminate the nutritional preparation. The invention provides also sufficient flexibility to adapt the size of the filter in relation to the amount of liquid to be filtered. As a result significant filter material savings can be obtained. The invention also provides a solution for improving the user convenience and reducing the time for preparing a ready-to-drink liquid.

OBJECT AND SUMMARY OF THE INVENTION

The present invention is defined according the appended claims.

The invention relates to a container holder for use in a nutritional liquid preparation machine for the preparation of a nutritional liquid from the mixture of ingredients contained in a container and liquid supplied by the machine in the container; said holder comprising a body with a container receiving seat arranged for receiving the container in a defined container sitting position and a filtration unit; such filtration unit comprising a liquid outlet wherein the filtration unit is arranged with the container holder to be movable between a first position in which the container receiving seat of the holder is uncovered for enabling the loading and unloading of the container in the container holder and a second position in which the container receiving seat is covered by the filtration unit for enabling the liquid outlet of the filtration unit to be positioned at the inlet side of the container when a container is present in the container holder.

The term container refers to any container containing an amount of nutritional ingredients in a mixing chamber adapted for being fed with liquid from the preparation machine. Preferably, the container is a capsule containing a pre-dosed amount of ingredients having an inlet side for receiving filtered liquid and a delivery side for delivering the mixed (ready-to-drink) nutritional liquid. Optionally, the container can be a baby bottle or a liner to be placed in a baby bottle and containing nutritional ingredients.

The dependent claims further define the invention.

In particular, the filtration unit further preferably comprises a liquid inlet at an inlet wall of the filtration unit. The liquid inlet is of a cross-section preferably several times smaller than the cross-section of the inlet wall thereby conferring a relatively localized area for the supply of liquid in the filtration unit. Such configuration promotes a safe supply of liquid in the unit under pressurized conditions.

The body preferably further comprises a dedicated housing for receiving the filtration unit in a defined second position; such housing being of larger cross-section than the cross-section of the container receiving seat and encompasses the contour of the container receiving seat. This configuration also ensures a proper positioning and engagement of the filtration unit with the container, thereby reducing the risks of liquid bypass and possible contamination of the liquid entering in the container.

Preferably, a sealing member is arranged about the liquid outlet to prevent liquid bypassing the filtration unit in the said second position. Again, the risk of liquid bypassing the filtration unit and contaminating the interior of the container is reduced.

In a preferred aspect of the invention, the liquid outlet comprises a perforating and/or tubular member such as a hollow needle. The perforating and/or tubular member enables to provide a better controlled injection of the liquid inside the container.

In a possible mode, the filtration unit is connected to the container holder by means of a hinge. In another mode, the filtration unit is a slider fitting in translational relationship in a guiding opening of the container holder. The device comprises a latch to releasably secure the filtration unit in the second position. The latch preferably extends by an actuation member placed at or close to the handle of the container holder. These modes provide more convenient and simple handling for the user.

Preferably, the filtration unit comprises a filter. The filter is placed inside a protective casing so that the casing encompasses the filter. The casing comprises the inlet wall with at least one liquid inlet and an outlet wall with at least one liquid outlet for delivering filtered liquid to the container. Such configuration participates to confer a safer unit; a safer arrangement of the filtration unit to the container holder with reduced risk of contamination and, consequently, a safe and hygienic nutritional product delivery.

In a possible aspect, the filter is arranged in a removable manner in the casing. Since only a limited part of the device must be exchanged to maintain a sufficiently high hygiene standard, this configuration confers considerable cost savings for the intensive uses of the device.

The filter preferably comprises a filter media such as a micro- or nano-porous filtering membrane. The filtering membrane may have a nominal pore size of less than 2 microns, more preferably less than 1 micron, most preferably of from 0.01 and 0.45 microns. The filter media may be supported by filter reinforcement support such as a plastic disc or grid. The filter media, e.g., filer membrane can be welded or moulded on the reinforcement support.

The appended drawings are given as a matter of non-exhaustive illustration of the preferred embodiments.

DETAILED DESCRIPTION OF THE DRAWINGS

Figure 1:
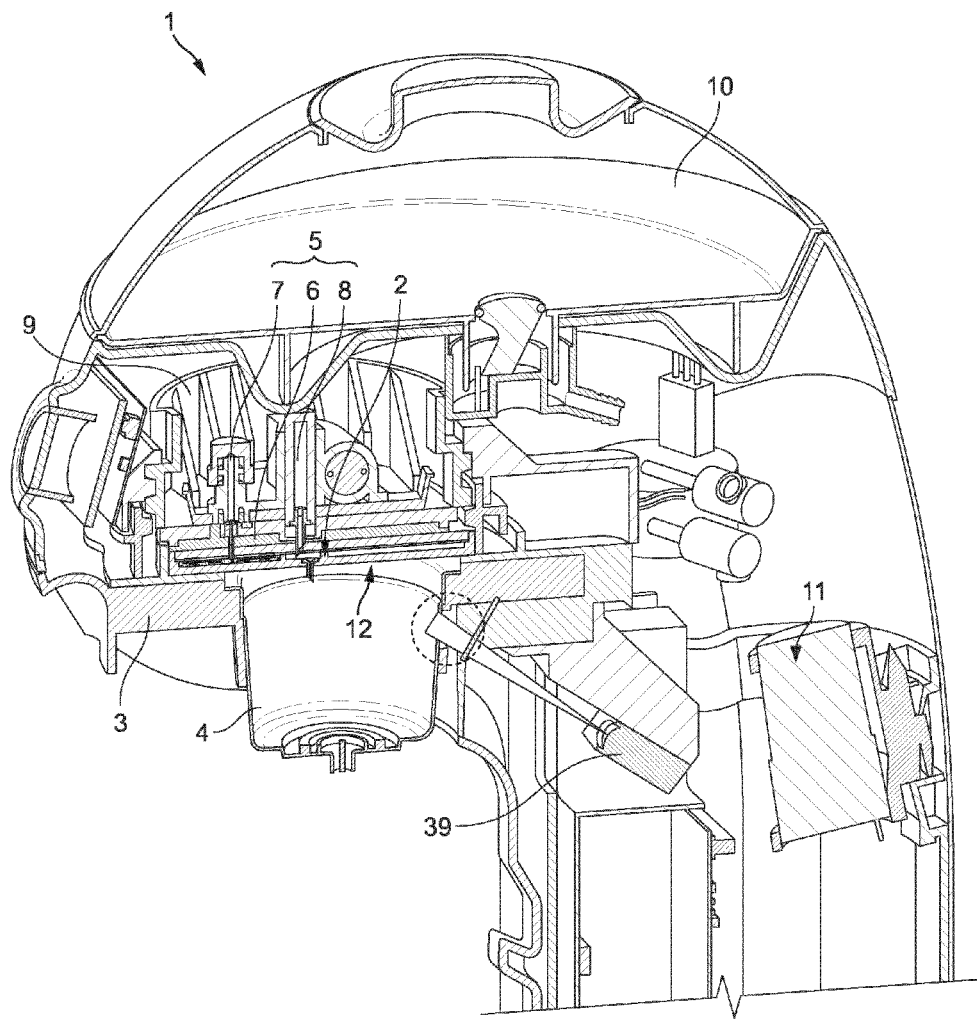
FIG. 1 shows a detailed cross section view of a preparation machine of the invention with a container affixed thereto.

A nutritional preparation machine 1 is illustrated on FIG. 1. The machine typically comprises a housing 2 for receiving a container holder 3. The container holder is preferably fully or partially removable from the housing. The container holder comprises a seat for receiving a container 4 filled with nutritional ingredients. In the present case, the container holder is configured as a drawer to be inserted in the housing along guiding means of the machine (not shown) such as described in co-pending European patent application No. 11152739.6 entitled: "Beverage production machine comprising features to facilitate capsule loading". The container 4 may be a single-use capsule which contains a predetermined amount of nutritional ingredients, such as infant formula powder. The capsule can be formed of a cup-shaped body which is closed by a top perforable sealing foil.

The housing further comprises a fluid supplying interface 5. The interface may comprise an engagement plate 6 from which a liquid injector 7 and a gas injector 8 protrude beyond the bottom surface of the plate 6 in direction of the container 4. The liquid injector 7 is required for feeding an appropriate amount of liquid in the container so that liquid can mix with the nutritional ingredients for preparing the nutritional liquid portion such as a portion of infant milk. The liquid injector 7 may comprise a hollow needle protruding outwardly from the plate to be able to perforate, if necessary, the sealing foil of the container.

The liquid injector 7 is thus supplied with liquid from a liquid reservoir 10. Liquid is typically water for being mixed with nutritional ingredients in the container which can be, for instance, a powder, a liquid extract or a gel. Liquid is supplied to the injector after being warmed in a heater (not shown) and is pressurized by a pump 11. The gas injector 8 is arranged to supply gas into the container in order to empty it from residual nutritional liquid at the end of the preparation cycle, in particular, once the pump supplying liquid to the container is stopped. Gas it typically compressed gas provided by an air pump or a compressed-gas cartridge in the machine (not shown). The gas injector may also comprise a hollow needle protruding from the plate or be a simple hole. The liquid and gas injectors are axially distant one another at the fluid supplying interface. Such distance is preferred to be able to have the liquid injector be located close to the front of the housing.

The fluid supplying interface is mounted on a frame 9 in a reciprocal manner between a retracted position allowing the container holder 3 to be inserted in the housing and a position in which the fluid supplying interface 5 is engaged against a filtration unit inserted between the interface and the container (called hereafter "liquid/gas feeding position") as will be described later in more detail. The fluid supplying interface 5 can be moved from the container holder loading position to the liquid/gas feeding position by mechanical and/or motorized activating means (not shown).

Figure 2:
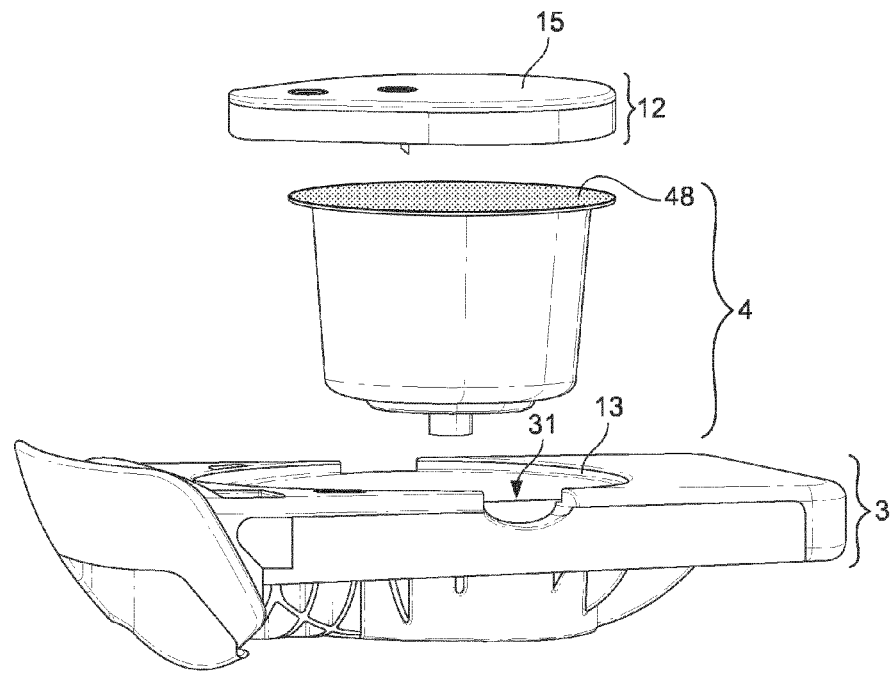
FIG. 2 shows, in perspective exploded view, a container holder, a container (containing nutritional ingredients) and a filtration unit according to a first embodiment of the invention.
Figure 3:
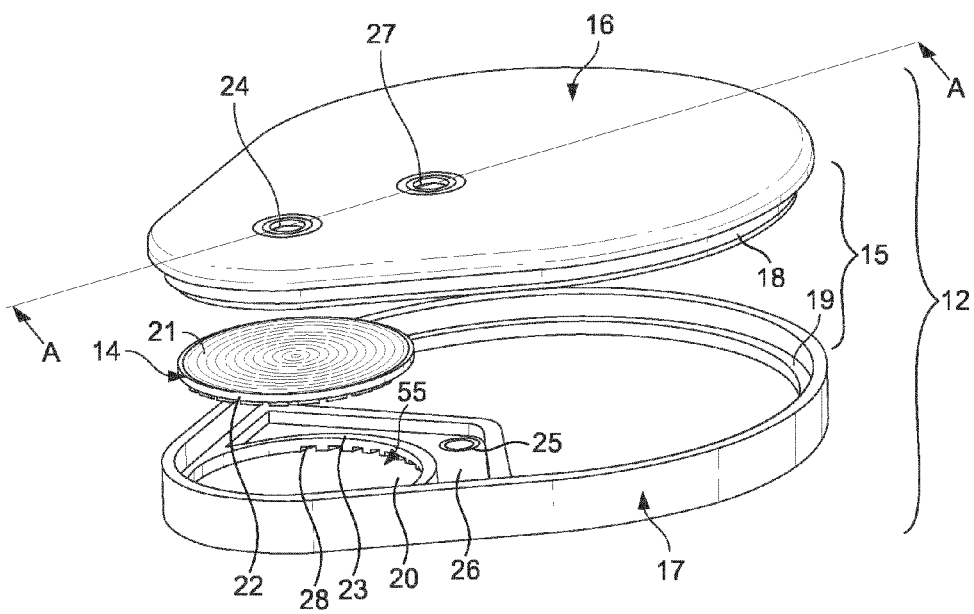
FIG. 3 shows, in perspective exploded view, a filtration unit according to the embodiment of FIG. 2.
Figure 4:
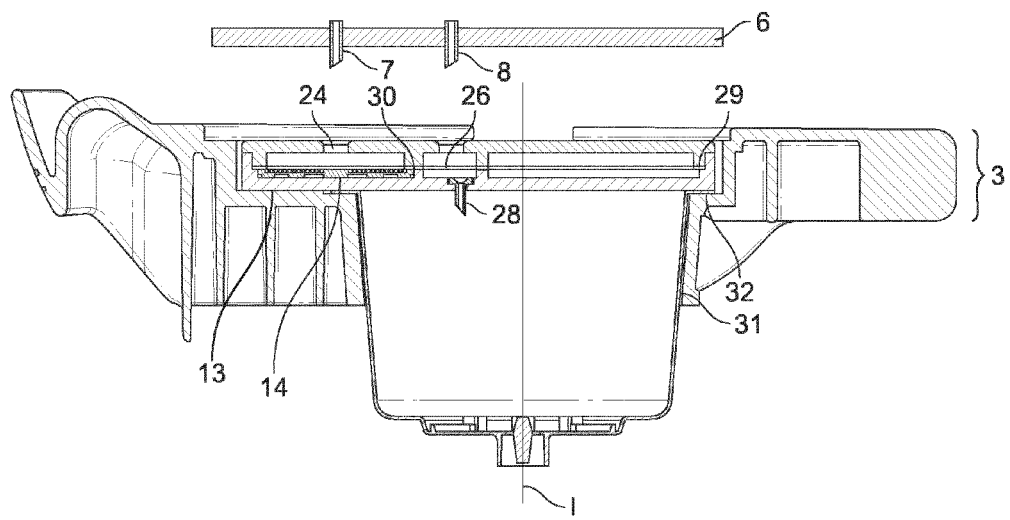
FIG. 4 shows, in longitudinal cross-sectional along axis A-A view, a container holder with a filtration unit holding a container and a fluid injection interface of the machine before engagement of the latter on the filtration unit.

FIGS. 2 to 4 illustrate a first mode of a filtration unit 12 of the invention. FIG. 2 shows the assembly formed by a container holder 3, a removable container 4 such as a single-use capsule containing nutritional ingredients and a removable filtration unit 12. In this example, the filtration unit 12 is a stand-alone element which can be placed on top of the capsule in a dedicated housing 13 of the container holder. As more visible in FIG. 3, the filtration unit 12 comprises a removable filter 14. For this, the filtration unit 12 comprises a protective casing 15 formed of a first and second covers 16, 17. The first cover 16 forms the inlet wall, whereas the second cover 17 forms the outlet wall. Both covers are connected together in a detachable manner. For instance, the first and second covers comprise complementary edge means 18, 19 which engage each other in closure of the casing. Such edge means 18, 19 form, for instance, complementarily-shaped circumferential edges which, when in friction or press-fitting engagement, permit a sufficient connection and demarcate a liquid-tight interior of the casing along the edges. Additional liquid-tight sealing means can be associated to the edges such as a rubber lining 29.

The casing demarcates a dedicated filter compartment 20 enabling the placing in a dedicated position of the removable filter 14. The filter 14 is preferably formed of a filter media 21 and a filter reinforcement support 22. The filter media can be, for instance, a micro-porous filter membrane, which is designed to remove contaminants from liquid injected in the filtration unit at the inlet side. The filter reinforcement support 22 has rigidity in flexure which is much higher than the filter media. The function of the support is essentially to enable a proper handling of the filter during insertion and removal from the casing, as well as maintaining the integrity of the filter media under liquid pressure during liquid filtration. The support can be bound to the membrane at least at its outlet side. It may have a grid structure or a similar aperture reinforcing rigidifying structure. Through-apertures in the support are necessary to allow liquid to freely traverse while reducing as much as possible unnecessary pressure loss. Furthermore, outwardly oriented channels can also be provided at the bottom of the support to allow liquid to be collected towards the periphery of the filter. The support can, for instance, be made of food grade plastic and/or rigid cardboard. The support could as well be arranged to cover both the inlet and outlet sides of the filter media, as a sandwich-type structure, in order to prevent direct contact of human fingers with the filter media.

The filter 14 can be given any suitable shape such as a disc shape as illustrated in the figures or any other form such as polygonal, rectangular, square, etc. The filter compartment 20 is so complementary shaped with a positioning wall 23 to facilitate the insertion of the filter in a relatively fixed and predetermined position. The compartment 20 is arranged in upstream communication with a liquid inlet 24 provided on the first cover. The distance between the filter 14 and the liquid inlet 24 is sufficiently large to prevent the liquid injector 7 from contacting the filter (FIG. 4). In a possible design (not shown), the liquid inlet can extend inwards the compartment by a grid-like structure which protects the filter against any risk of puncture. The filter compartment 20 is in communication downstream with the liquid outlet 25. The liquid outlet is formed in the second cover 17 forming the outlet side of the filtration unit. Between the filter compartment 20 and the liquid outlet 25 can be formed a second compartment 26 in communication with an upstream gas inlet 27 also provided in the first cover 16. The liquid inlet 24 and gas inlet 27 are transversally distanced (or axially offset) one another and separated by wall means of the casing such as the position wall means 23 through which are provided transversal apertures 55 allowing liquid transfer from the first compartment downstream the filter to the second compartments in its way to the liquid outlet 25. As noticeable, the gas inlet 27 is so placed to enable a direct communication with the liquid outlet 25 without passing through the filter. This configuration reduces the risk of damaging the filter and it also reduces a too high gas pressure resistance in the filtration unit. It is also worth noticing that this configuration enables to provide a filter which is transversally offset relative to the central axis I of the container 4 (FIG. 4). This arrangement enables to have the filter be better supported on the side of the container holder.

The size of the filter 14 may be varied depending on the amount of liquid to be filtered. In such case, the size of the compartment can be varied accordingly or be designed in such a manner to be able to accommodate a number of different filter sizes. The filter may also be given the same size but the size of the filter media be varied. For example, the support remains of the same diameter and the filter media is varied in size onto the support. Therefore, a series of different filters can be envisaged to better adapt the filtering properties of the filtration unit to the liquid amount.

Upstream the filter 14, i.e., between the liquid inlet and the inlet side of the filter, the filter compartment 20 can be made liquid-tight around the filter media, thanks to a sealing member such as a rubber lining 30 inserted between the two covers. The lining 30 can be applied onto the edge of the demarcating wall of the compartment on the inside of the first cover 16. Of course, the lining 30 may alternatively or additionally be applied on the upper edge of the positioning wall 23 of the second cover 17. The lining 30 may also be integral with the lining 29.

The liquid outlet of the filtration unit 12 is preferably provided with a perforating member 28 such as a hollow needle. The perforating member 28 protrudes externally from the second cover towards the container 4 when the unit is in position in the container holder 3. The filtration unit is positioned in such a manner that the perforating member 28 perforates a sealing foil 48 of the container. Filtered liquid can thus be injected in the container directly by the filtration unit. The risk of contamination of the filtered liquid is therefore reduced to minimal.

As illustrated in FIG. 4, the container holder 3 has a receiving seat 31 which is conformed in dimension and shape to the container. The container preferably comprises an outwardly peripheral protruding rim 32 which enables to maintain the container in a stable position in the holder. The holder is further designed with the dedicated housing above the seat 31, which extends both axially and transversally beyond the seat 31, to provide a complementarily shaped room for receiving the filtration unit. When the stand-alone filtration unit 12 is inserted in position in the housing 13, its protruding perforating member 28 engages the container. The fluid supplying interface of the machine comprising the engagement plate 6 can be moved towards (e.g., downwards) the filtration unit thereby resulting in the liquid injector sealingly engaging in the liquid inlet 24 and the gas injector sealingly engaging in the gas inlet. The sealing between the injectors and the filtration unit can be obtained by providing the plate 6 with an elastic (e.g. rubber) lining or by providing a soft or elastic sealing member localized on the casing 15 around the liquid and gas inlets and/or on the plate 6 around the liquid and gas outlets.

A second mode is illustrated on FIGS. 5 to 12. For simplification, the same references are used to designate the same technical means. In this embodiment, the filtration unit 12 is hingedly affixed to the container holder in such a manner that the unit can move between a first position in which the container receiving seat 31 of the holder is uncovered for enabling the loading and unloading of the container 4 in the container holder (i.e., "container ejection position") and a second position in which the container receiving seat is covered for enabling the liquid inlet of the unit to be positioned at the inlet side of the container when a container is present in the container holder (i.e., "closed operational position"). The container loading and ejection positions are respectively apparent in FIGS. 5, 11 and 12. The closed operational position is apparent in FIGS. 8 and 9.

Figure 5:
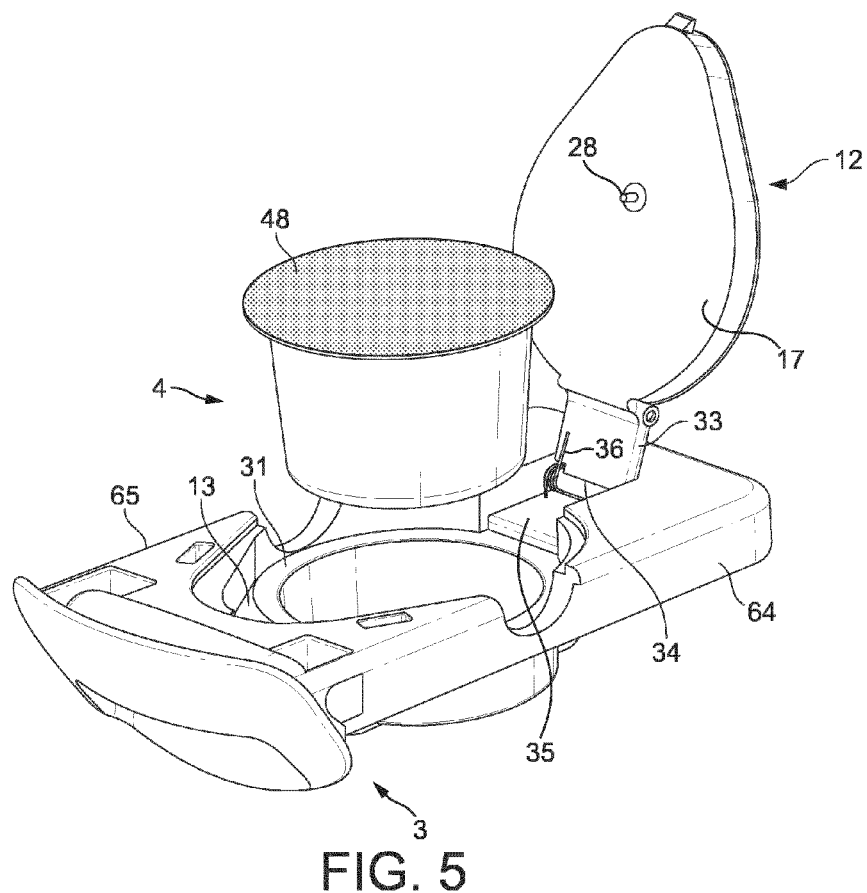
FIG. 5 shows, in perspective view, a container holder with a filtration unit according to a second mode in a loading mode of the capsule.
Figure 8:
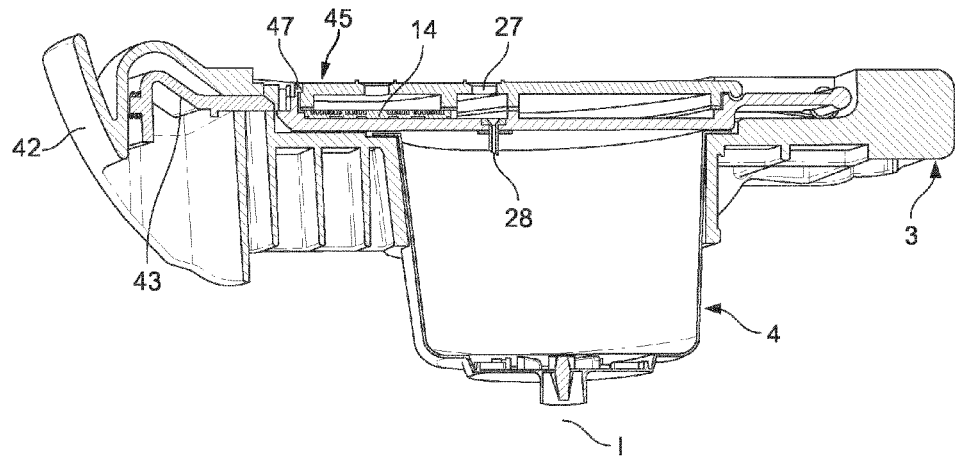
FIG. 8 shows in perspective cross sectional view along axis A-A of the unit of FIGS. 6 and 7, an assembly ready for insertion in a preparation machine, comprising a container holder, a container and a filtration unit in closed operational position.
Figure 10:
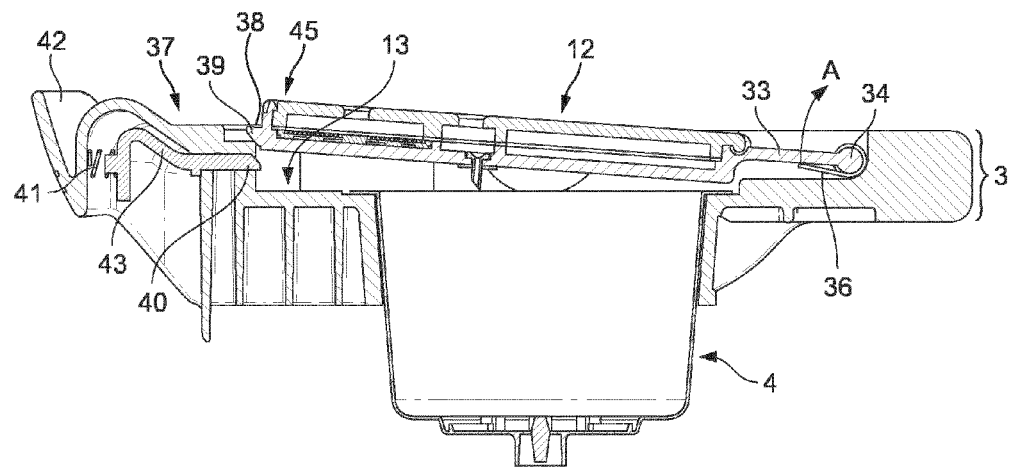
FIG. 10 shows, in cross sectional view along axis A-A of the unit of FIGS. 6 and 7, an assembly comprising a container holder, a container and a filtration unit moving from the closed operational position to the container ejection position.
Figure 11:
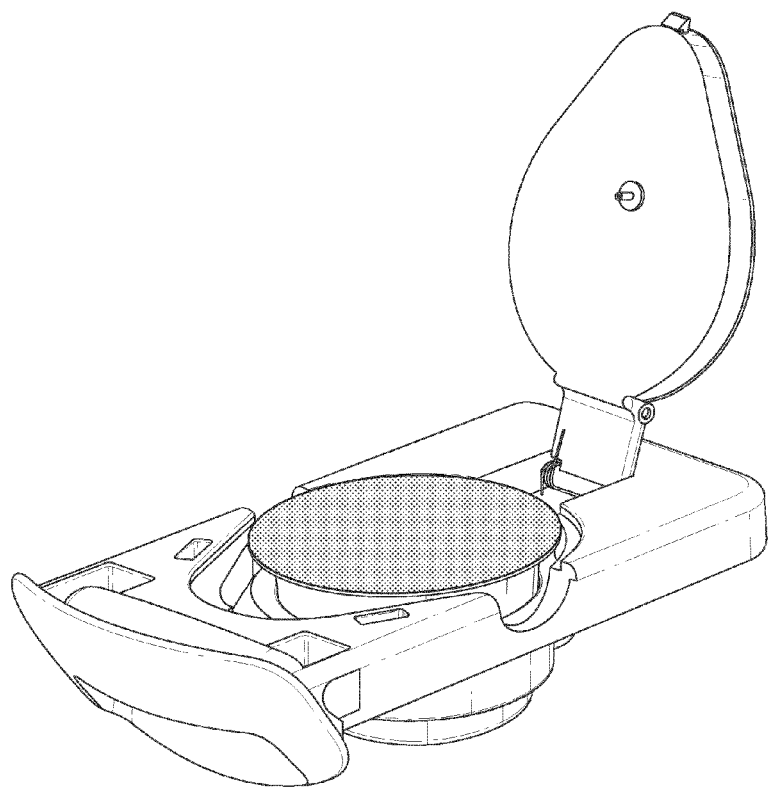
FIG. 11 shows, in perspective view, the filtration unit of FIG. 10 in the container ejection position.
Figure 12:
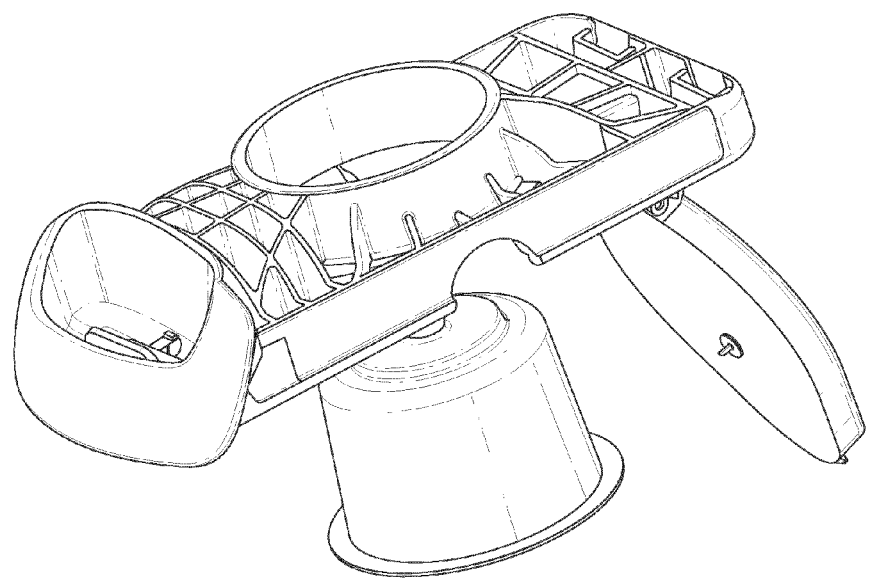
FIG. 12 shows the ejection of the container from the container holder in the container ejection position when the container holder is simply turned up-side-down.

As illustrated on FIGS. 5 and 10, the filtration unit 12 comprises a rear extension 33, extending from the second cover 17 of the casing, which is rotatably mounted via a hinge 34 to the container into a recess 35 of the holder. The term "hinge" is to be taken as covering a pivot or rotational connection taken as such or combined to one or more translational degree of freedom to form a more complex articulation. Such configuration enables the casing to be rotated from the container ejection position illustrated, e.g., at a close to vertical angle, to the engaged closed operational position in which the filtration unit occupies the dedicated housing 13. A spring 36 can be associated to the hinge 34 in the recess in order to bias the unit towards the container ejection position. The filtration unit is furthermore kept in closed operational position by means of a releasable latch 37 (FIG. 10). As a matter of example, the releasable latch 37 can comprise, on the filtration unit, a recess 38 formed on the front side of the casing such as formed by a ramp-shaped tooth 39 and, on the holder, a relief 40 forming a second ramp-shaped tooth which retracts under the effect of a resilient means such as a spring 41 lodged in the handle 42 of the container holder. The relief 40 can extend by an arm 43 guided through an opening of the container holder, thereby forming an actuation member. At rest, the arm is pushed by the spring 41 to maintain the relief 40 in extended position. When the filtration unit is pushed in the dedicated housing 13 in closed operational position, the tooth 39 of the unit pushes the tooth 40 which retracts in the holder by compressing the spring 41. In the fully lodged position of the unit in the holder, the tooth 40 is urged back by the spring to engage the recess 38 and consequently locks the tooth 39 (FIG. 8). For releasing the latch 37, it suffices to actuate the actuation member 43 to retract the tooth 40 against the compression force of the spring 41. This causes the filtration unit to eject in opening direction A by effect of the spring 36 placed at the hinge 34. Once the latch is released, the container holder can be placed up-side-down to eject the container which falls by gravity from its seat 13 (FIG. 12).

Figure 6:
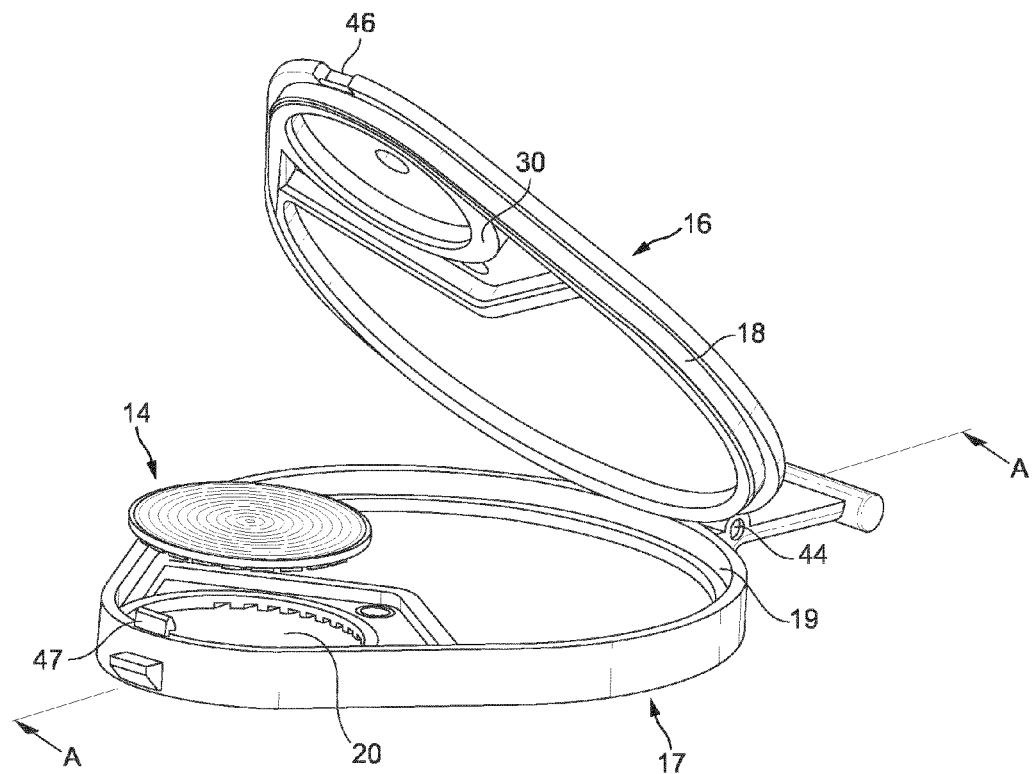
FIG. 6 shows in perspective view (from a top angle), a filtration unit in open configuration for exchange of the filter in the unit.
Figure 7:
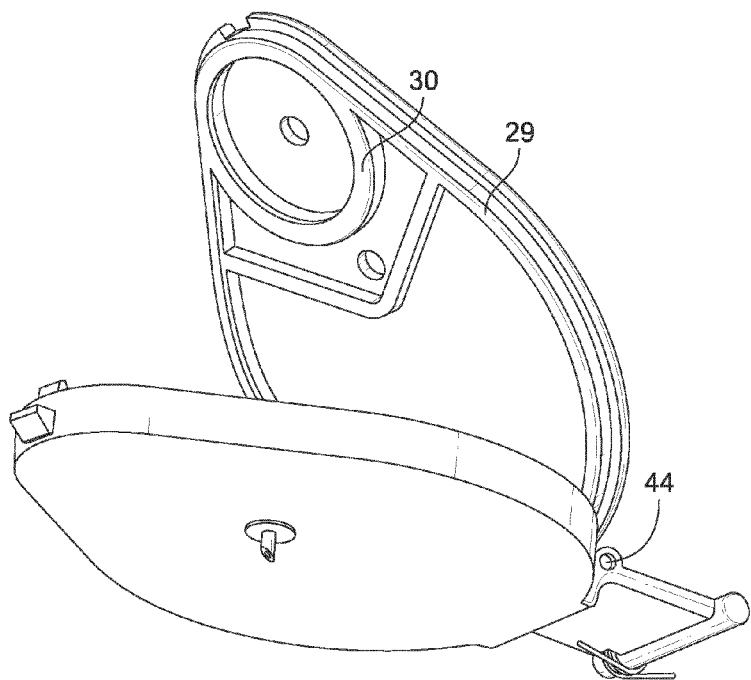
FIG. 7 shows in perspective view (from a bottom angle), a filtration unit in open configuration for exchange of the filter in the unit.

FIGS. 6 and 7 illustrate in more detail the filtration unit in opening for allowing the exchange of the removable filter 14. Contrary to the preceding mode, the first and second covers 16, 17 of the casing are only partially detachable. More particularly, the first and second covers can be detached at their engaging peripheral edges to leave the cavity of the casing open, in particular, for giving access to the dedicated filter compartment 20 to a removable filter 14. The first and second covers are further connected by an hinge 44 to prevent the full separation of the covers. A rubber lining is also present on at least one cover to provide a liquid-tight closure of the casing.

Of course such hinge can be any sort of suitable articulation which is not necessary a pure rotating pivot but may be a translational and/or rotational guiding means of the two covers 16, 17. For instance, the hinge could be a sliding means enabling the first cover 16 to slide relative to the second cover 17 between open and closed positions of the compartment 20.

Figure 9:
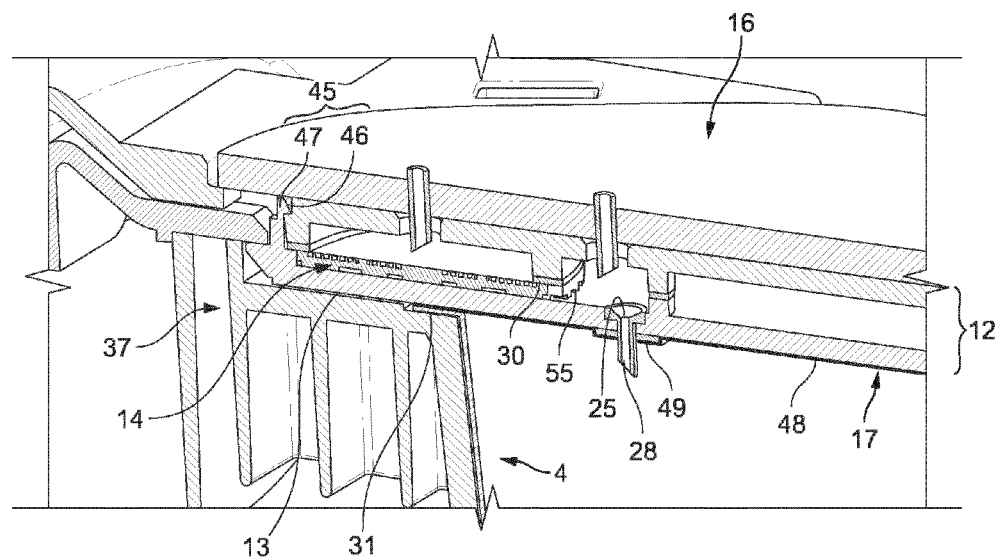
FIG. 9 shows in detailed perspective and cross sectional view, the engagement of the filtration unit with the fluid interface of a nutritional preparation machine.

In the present mode, the first and second covers of the casing are securely locked together by means of a non-permanent connection, in particular, a releasable latch 45 (FIGS. 8 and 9). The releasable latch can be a combination of a recess 46 formed in the first cover 16 and a relief 47 formed in the second cover 17 (or vice versa). The relief 47 is shaped to engage in the recess in a spring-biased fashion, such as by making the relief sufficiently elastic. The latch can be manually disengaged by applying a sufficient pulling effort on the cover. Of course, other equivalent releasable latching means are possible to sealingly close the casing along its peripheral engaging edges.

FIG. 9 illustrates the second mode of the filtration unit 12 when in engagement in the preparation machine with a container 4 in position in the holder. The perforating member 28 of the filtration unit perforates in engagement the sealing foil 48 of the container. A sealing means 49, such as a rubber O-ring, is further present about the perforating member to provide a sufficient liquid tightness at the liquid injection site and therefore to prevent resurgence of liquid between the container and the filtration unit.

Figure 13:
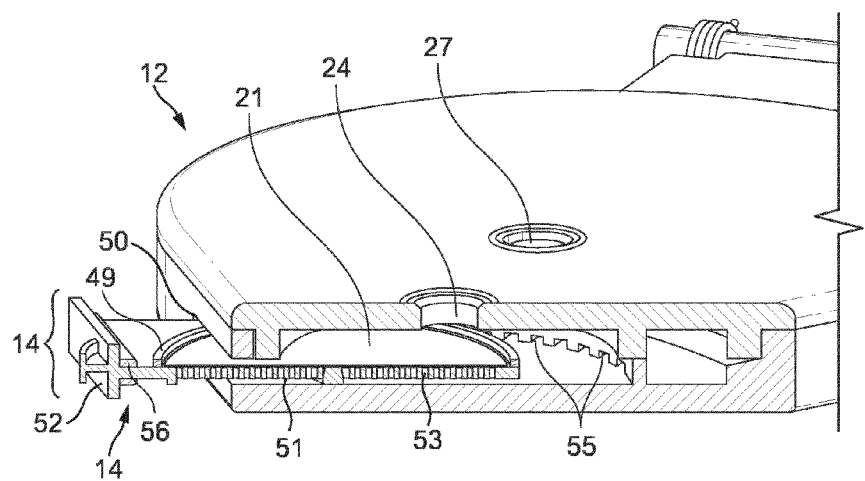
FIG. 13 shows, in detailed perspective and cross-sectional view, a filtration unit according to a third embodiment.
Figure 14:
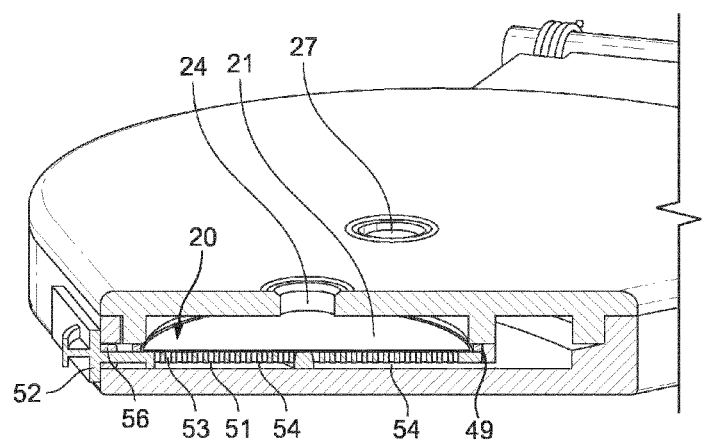
FIG. 14 shows, in detailed perspective and cross-sectional view, the filtration unit of FIG. 13, with the filter being operationally in place in the unit.

FIGS. 13 and 14 illustrate a third possible mode of the filtration unit 12 of the invention in which the removable filter 14 is a drawer which can be inserted in sliding relationship through an open window 50 of the casing. For example, the reinforcement support is formed in one piece with a grid portion 51 and a sealing door 52. The grid portion 51 has a plurality of through passages 53 for the axial flow of the filtered liquid and channels 54 for the radial flow of the liquid towards the liquid passages 55 of the compartment 20. The grid portion is covered by a filter membrane 21 which can be sealed at its periphery onto the grid portion. The membrane is bordered by a sealing member 49 such as an O-ring which is affixed onto the surface of the support and/or filter membrane. The sealing member is positioned in correspondence with demarcating walls of the compartment pertaining to the first cover such that the compartment is made liquid-tight between the liquid inlet 24 and the filter. An additional liquid tightness can be obtained by a sealing member 56 positioned between the window 50 and filter. In particular, it is particularly suitable to provide a resilient sealing member on the sealing door or have the sealing door made itself of a resilient material such as rubber or soft plastic. Therefore, filtered liquid is prevented from leaking from the open door when the filter is sufficiently slidably engaged in the casing.

Figure 15:
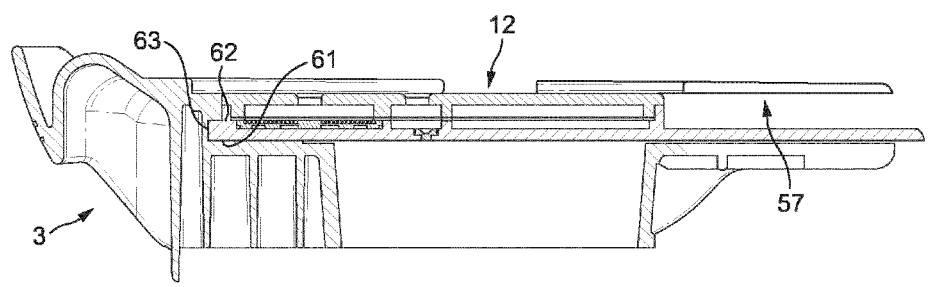
FIG. 15 shows, in longitudinal cross sectional view a container holder according to another variant of the invention.
Figure 16:
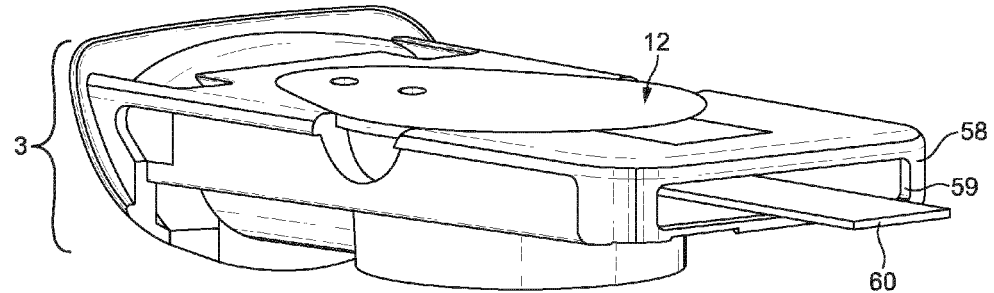
FIG. 16 shows in perspective view a container holder of FIG. 15.

FIGS. 15 and 16 illustrate another embodiment for the container holder 3 of the invention. In this embodiment, the filtration unit 12 is connected in the dedicated housing of the container holder as a slider fitting in translational relationship with a guiding opening 57 of the holder. The guiding opening comprises a window 59 which is formed in the front side 58 of the holder. The filtration unit comprises a handling portion 60 which protrudes outwardly of the front side 58 of the holder to enable the withdrawal of the filtration unit. The filtration unit can be secured in position against a lifting force, at its front end 61, opposite the handling portion, by a neck portion 62 fitting in a recess 63 of the container holder 3. In this example, the liquid outlet can be formed by a simple aperture in the casing without injection needle or by a retractable needle (not illustrated) to facilitate the sliding insertion of the filtration unit in the holder.

It should be noted that the embodiments of the present invention can be combined in many different ways. For instance, the drawer-like removable filter of the third embodiment can be used in a stand-alone filtration unit, i.e., a filtration unit which is not partially connected to the container holder such as by an hinge. Also, the stand-alone filtration unit of the first embodiment could be made of two covers which are partially separable such by an hinge or equivalent.

The invention claimed is:

1. A container holder for use in a nutritional liquid preparation machine for the preparation of a nutritional liquid from a mixture of ingredients contained in a container and liquid supplied by a machine in the container; said holder comprising:
  a body with a container receiving seat arranged for receiving the container in a defined container sitting position; and
  a filtration unit comprising a filter and a protective casing encompassing the filter, the protective casing comprising an outlet wall with at least one liquid outlet for delivering filtered liquid to the container, the protective casing further comprising an inlet wall having at least one liquid inlet and a gas inlet for receiving a gas injector of a beverage machine, the gas inlet being axially offset relative to the at least one liquid inlet and being in fluid communication with the liquid outlet; and
  wherein the filtration unit is arranged with the body to be movable between a first position in which the container receiving seat of the body is uncovered for enabling the loading and unloading of the container in the container holder and a second position in which the container receiving seat is covered by the filtration unit for enabling the liquid outlet of the filtration unit to be positioned at an inlet side of the container when a container is present in the container holder.

2. The container holder of claim 1, wherein the body comprises a dedicated housing for receiving the filtration unit in the second position; such housing being of larger cross-section than the cross-section of the container receiving seat and encompasses the contour of the container receiving seat.

3. The container holder of claim 1, wherein a sealing member is arranged about the liquid outlet to prevent liquid bypassing the filtration unit in the second position.

4. The container holder of claim 1, wherein the filtration unit is connected to the container holder by a hinge.

5. The container holder of claim 1, wherein the filtration unit is a slider fitting in translational relationship in a guiding opening of the container holder.

6. The container holder of claim 1, further comprising a latch to releasably secure the filtration unit in the second position.

7. The container holder of claim 6, wherein the latch extends by an actuation member placed at or close to a handle of the container holder.

8. The container holder of claim 1, wherein the filter is arranged in a removable manner in the casing.

9. The container holder of claim 8, wherein the casing is formed by a first cover forming the inlet wall and a second cover forming the outlet wall, the first cover and the second cover being at least partially detachable from one another to enable the filter to be placed in a dedicated compartment of the casing.

10. The container holder of claim 9, wherein the first cover and the second cover are guided to one another in opening of the casing by at least one of a hinge, a transversal connection means, and rotational connection means.

11. The container holder of claim 9, wherein the casing comprises an open window arranged to slidably receive the filter therein.

12. The container holder of claim 1, wherein the liquid outlet comprises a perforating member protruding from the outlet wall.

13. The container holder of claim 1, wherein the body comprises lateral guiding edge portions on each side of the receiving seat; said edge portions being arranged linearly to provide a translational guiding by complementary guiding recesses of the nutritional liquid preparation machine.

14. A nutritional liquid preparation machine comprising the container holder of claim 1.

* * * * *